United States Patent
Bayzelon et al.

(10) Patent No.: US 7,608,161 B2
(45) Date of Patent: *Oct. 27, 2009

(54) METHOD AND APPARATUS FOR MANUFACTURING PRESSURE SENSITIVE ADHESIVE LABEL STOCKS WITH PRINTING UNDER ADHESIVE AND PRODUCT PRODUCED THEREBY

(76) Inventors: François Bayzelon, 19 rue de Richelieu, Chambly, Québec (CA) J3L 2C1;
Frédéric La Brie, 1220 des Rossignols, Boucherville, Québec (CA) J4B 8B7;
Daniel Brochu, 2193 de Chambly, Montreal, Québec (CA) H1W 3J3

( * ) Notice: Subject to any disclaimer, the term of this patent is extended or adjusted under 35 U.S.C. 154(b) by 31 days.

This patent is subject to a terminal disclaimer.

(21) Appl. No.: 11/519,406

(22) Filed: Sep. 12, 2006

(65) Prior Publication Data
US 2007/0006969 A1 Jan. 11, 2007

Related U.S. Application Data

(60) Continuation of application No. 11/008,301, filed on Dec. 9, 2004, now abandoned, and a division of application No. 10/210,212, filed on Aug. 1, 2002, now Pat. No. 6,852,191.

(51) Int. Cl.
*B32B 37/08* (2006.01)
*B32B 38/14* (2006.01)
*B05D 1/28* (2006.01)
*B05D 5/08* (2006.01)

(52) U.S. Cl. .............. 156/272.2; 156/273.3; 156/275.7; 156/277; 156/289; 427/428.01; 427/428.07; 427/428.09; 427/428.11; 427/428.12

(58) Field of Classification Search ................. 156/184, 156/230, 241, 272.2, 273.3, 275.5, 275.7, 156/277, 278, 280, 289; 427/428.01, 428.07, 427/428.08, 428.09, 428.11, 428.12
See application file for complete search history.

(56) References Cited

U.S. PATENT DOCUMENTS 4,061,109 A 12/1977 Allen
4,216,252 A * 8/1980 Moeller ...................... 427/387
4,261,286 A 4/1981 Kupfer (Continued)

OTHER PUBLICATIONS

Meltex Hot Melt Lab Coater CL 2018, Nordson Corporation, Oct. 1996, 2 pages.
Meltex Hot Melt Lab Coater CT 5000, Nordson Corporation, Oct. 1996, 2 pages.
D. Guenther, "Coating Methods for Pressure Sensitive Adhesives", Technical Seminar Proceeding, Schaumberg, IL, May 4-6, 1994, pp. 221-236.
Perma-Flex Technical Bulletin, Aquaseal Rolls, Oct. 4, 1993, 1 page.

*Primary Examiner*—Philip C Tucker
*Assistant Examiner*—Sing P Chan
(74) *Attorney, Agent, or Firm*—Young Basile

(57) ABSTRACT

A method and apparatus for making adhesive-backed labels. Glassine paper stock is unwound from a roll, coated with photo-cationic silicone and exposed to wavelength-controlled illumination to cure. Hot melt adhesive is applied over the silicone. Simultaneously, label stock is fed with the coated glassine paper to laminating rollers where the two are joined. Illumination is provided by a dichroic reflector.

6 Claims, 6 Drawing Sheets

U.S. PATENT DOCUMENTS

| | | |
|---|---|---|
| 4,960,482 A | 10/1990 | Crane et al. |
| 5,405,475 A | 4/1995 | Kraft et al. |
| 5,425,809 A | 6/1995 | Person |
| 5,861,633 A | 1/1999 | Mandellos |
| 5,895,547 A | 4/1999 | Kathrein et al. |
| 5,965,226 A | 10/1999 | Muschelewicz et al. |
| 5,983,797 A | 11/1999 | Secor |
| 6,071,110 A * | 6/2000 | Mikkelsen .................. 425/327 |
| 6,509,077 B1 | 1/2003 | Wantuch et al. |
| 6,759,664 B2 * | 7/2004 | Thompson et al. ........ 250/492.1 |
| 2001/0030020 A1 | 10/2001 | Nandy et al. |

* cited by examiner

METHOD AND APPARATUS FOR MANUFACTURING PRESSURE SENSITIVE ADHESIVE LABEL STOCKS WITH PRINTING UNDER ADHESIVE AND PRODUCT PRODUCED THEREBY

RELATED APPLICATION

This application is a continuation of U.S. application Ser. No. 11/008,301 filed on Dec. 9, 2004, now abandoned. The content of the U.S. patent Ser. No. 11/008,301 is incorporated herein by reference.

FIELD OF THE INVENTION AND CROSS-REFERENCED TO RELATED APPLICATION

This invention relates to self-adhesive labels and the like and, more particularly, to a method and apparatus for efficiently manufacturing pressure sensitive self-adhesive label stock in such a way as to allow printing on the adhesive side. This application is a divisional of U.S. Ser. No. 10/210,212, filed Aug. 1, 2002 now U.S. Pat. No. 6,852,191, and claims priority thereto.

BACKGROUND OF THE INVENTION

It is known in the art to apply printed adhesive-backed labels to containers for products such as liquid soap and detergent, shampoo, food products and vitamins to name only a few. Self-adhesive labels are generally made in such a way as to require the removal of a "release paper" from the adhesive side of the label before it is applied to the container. Removal of the release paper exposes the pressure sensitive adhesive, permitting the label to be applied to the container. Slight pressure is then applied to create the adhesive bond.

The term "pressure sensitive adhesive," as used herein, refers to an adhesive which bonds to an application surface as a result of applied pressure as opposed to the evaporation or absorption of a solvent to form a solid material bond.

Adhesive-backed labels and the like typically comprise the laminated combination of a printable face stock, a pressure sensitive adhesive on the back or reverse side of the face stock, a silicone layer and a backing paper to which the silicone layer is relatively strongly bonded. The face stock can be transparent or opaque. Opaque stock can be printed on both sides while transparent stock can typically only be printed on one side. Double-side printing is desirable where, for example, the printed label is applied to a transparent container such as a plastic bottle filled with a relatively transparent fluid such as liquid soap or detergent; i.e., the printing on the back or reverse side of the finished, applied label can be viewed through the container and the product to provide a pleasing effect or additional information about the product and/or its manufacturer.

The adhesive which constitutes a layer between the face stock and the silicone is typically water based and, therefore, requires relatively long air drying time. The backing paper is usually "glassine paper," a material which, like the face stock, is available in rolls and accepts the silicone layer which is necessary to produce the release effect. The laminated combination of glassine paper and cured silicone is referred to as a "release paper."

The prior art method of manufacturing pressure sensitive adhesive labels and/or face stock typically involves the step of coating a glassine paper with silicone and hanging the de-reeled, silicone coated paper on a suitable support to cure.

After this first step, the cured release paper is re-reeled and taken back to the entry point of a second lamination process in which the adhesive is applied. Once again the de-reeled, adhesive coated release paper is hung out in the 200 ft. structure to cure. After curing it is re-wound and again subjected to a lamination step to add the printable label stock.

After this manufacturing process has been completed, the re-reeled laminated label stock is provided to a printer who again de-reels the stock to print on the indicia necessary to create a label.

The prior art manufacturing method described has a number of drawbacks. In the first place, the process described above requires a relatively large structure with a controlled atmosphere; i.e., adequate systems to control humidity and temperature within the curing structure. Secondly, the prior art method described above requires numerous de-reeling and re-reeling or re-winding steps and multiple lamination steps.

Thirdly, the prior art method described above makes it particularly difficult to print on the reverse side of the label stock; i.e., the side to which the adhesive is relatively strongly bonded. Where reverse-side printing is desired, the completed, pressure sensitive adhesively-backed label stock must be de-laminated and the printing must typically be applied over the adhesive. This gives rise to blurry, less definite printing and typically requires protection of the printed adhesive through the addition of, for example, UV varnish or UV glued film.

SUMMARY OF THE INVENTION

According to a first aspect of the present invention, a method for manufacturing pressure sensitive adhesive labels or label stock is provided, which method is simpler and more expeditious to carry out than the prior art manufacturing method described above. In particular, the method of the present invention eliminates the need for multiple lamination passes, long curing times and the associated de-reeling and re-reeling or re-winding steps described above.

In general the method of the present invention is achieved by providing a reel or roll of backing material such as glassine paper, applying a fast-curing silicone to the backing material as it is de-reeled, curing the silicone on-line, applying hot melt adhesive over the cured silicone, providing a reeled face stock in a size match for the backing paper, and laminating the face stock to the adhesive-coated release paper to form a fully laminated product in what is essentially a single pass. The laminated product can be made in multiple-label widths, in which case it may be slit into single label widths before being removed for shipment and/or further processing.

In the preferred form hereinafter described in detail, the silicone which is used to form the release paper is a photo-cationic silicone which cures rapidly when exposed to ultraviolet light. Accordingly the silicone can be rapidly cured before the adhesive is applied. Further according to the preferred style of carrying out the inventive method, the adhesive is a commercially available "hot melt" adhesive which is applied in a carefully controlled thickness and is quickly cooled by water-cooled rollers and partially re-solidified in or immediately prior to the final lamination step.

One of the numerous advantages which obtains from the inventive method is the ability to preprint on the reverse side of the face stock before the adhesive is applied thereby to eliminate the need for subsequently de-laminating the pressure sensitive adhesive label stock at a point downstream in the overall manufacturing process. Moreover the preprinted label stock is laminated with the adhesive after printing, thus eliminating the likelihood for blurred printing on the reverse side of the label stock.

According to a second aspect of the invention, an apparatus is provided for producing multiple-layer laminated pressure sensitive label stock in what is essentially a single pass operation and without the need for curing substantial lengths of partially laminated material in an atmosphere controlled structure. In general this is achieved by providing an apparatus which applies a thin layer of photo-cationic silicone to the interior surface of a backing-paper such as glassine paper, means for rapidly curing the silicone by exposure to a controlled illumination source, means for applying a controlled layer of hot-melt adhesive to the silicone, and means for laminating a face stock to the adhesive-coated release paper.

In the preferred form the subject apparatus includes a special wave length discriminating UV reflector, hereinafter called a "dichroic" reflector to control the wave length content of the illumination applied to the photo-cationic silicone. Similarly the apparatus comprises means for applying a carefully thickness-controlled layer of hot melt adhesive over the cured silicone. Finally the apparatus comprises a pair of rollers through which the release paper and face stock are simultaneously passed to form the end product.

Further and additional features and advantages of the method and apparatus inventions will be described in the following detailed specification which is to be read in conjunction with the accompanying drawings.

DETAILED DESCRIPTION OF THE ILLUSTRATIVE EMBODIMENT

Figure 1:
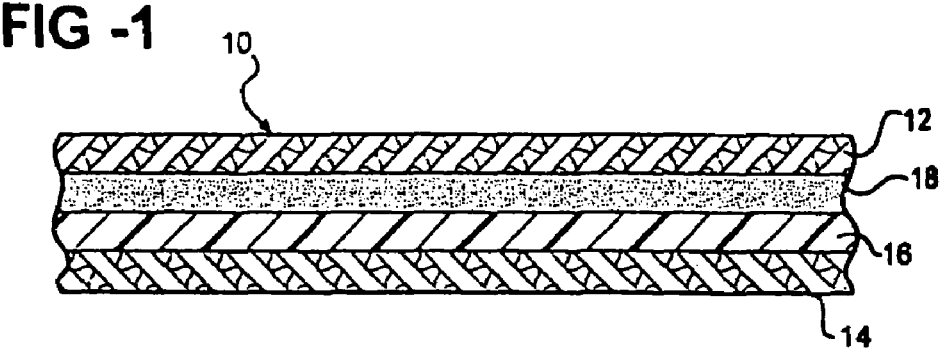
FIG. 1 is a cross sectional drawing of a self adhesive label stock with a releasable backing manufactured in accordance with the method and apparatus aspects of the present invention.

FIG. 1 shows in cross section a self-adhesive, releasably backed label strip 10 comprising four distinct laminated layers the thicknesses of which are not to scale and are exaggerated in FIG. 1 to assist in the understanding of the following description. The laminated structure 10 comprises a top most layer of double side face stock 12 suitable for receiving various types of printing compositions on either or both opposite surfaces thereof. The face stock 12 is, therefore, pre-printed with labeling indicia on one or both sides in accordance with the present invention.

The structure 10 further comprises a glassine paper layer 14 which constitutes a primary component of the releasable backing. The inside surface of the glassine paper 14 is first coated with a layer 16 of photo-cationic silicone to form the second component of what is typically referred to as a "release paper." A layer 18 of hot melt adhesive is disposed atop the silicone layer 16 and between the silicone layer and the label stock 12.

The adhesive 18 forms a strong bond with the inside surface of the stock 12 whether or not such inside surface is printed, and a relatively weak bond with the cured silicone layer 16. Accordingly, it is possible in use to separate the combination of the stock 12 and the adhesive 18 from the combination of glassine paper 14 and silicone layer 16. Thereafter the label stock, properly trimmed into individual labels, is ready to be applied to an application surface such as a plastic detergent bottle. Pressure is applied to the label to create the adhesive bond between the label and the application surface through the medium of the adhesive layer 18.

Figure 2:
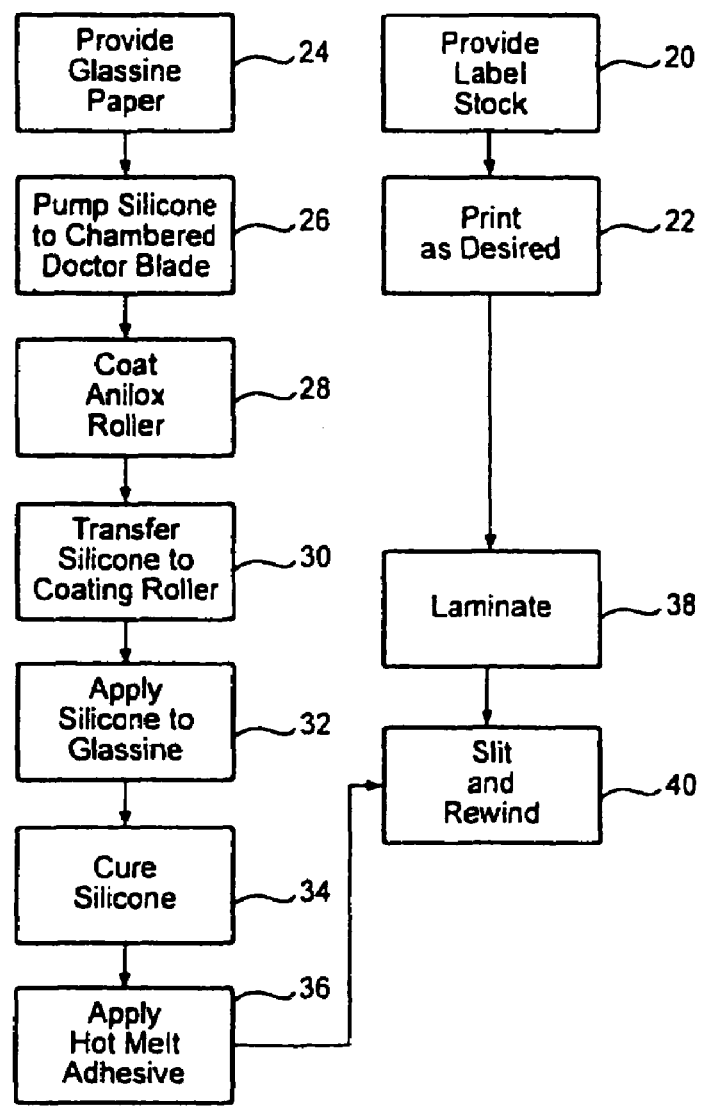
FIG. 2 is a process diagram for a preferred form of the method invention.

Referring now to FIG. 2, the basic steps of a preferred and illustrative process for making product 10 will be described. At step 20 a suitable face stock 12 is provided. As shown at 22, the stock 12 may be de-reeled and printed on one or both sides before being laminated to a release paper.

Step 24 is to provide the gassine paper 14 in a form suitable for automated processing in substantial quantities. This is typically carried out by providing a roll of glassine paper and mounting the roll on a de-reeling system for further processing as hereinafter described.

Step 26 is the first step in further treatment of the glassine backing paper 14. This step involves pumping photo-cationic silicone to a chambered doctor blade hereinafter described using a peristaltic pump to eliminate foaming. Thereafter step 28 is carried out to coat a porous ceramic roller such as an "ANILOX®" roller with a carefully controlled layer of the silicone material. In this step the layer of silicone material is smoothed to ensure that all of the pores of the ANILOX® ceramic roller are filled.

Step 30 is carried out to transfer the silicone material from the ANILOX® roller to a coating roller which is preferably a rubber cylinder running somewhat faster than the glassine paper and in the opposite direction to eliminate low spots in the applied silicone.

Step 32 involves the application of the silicone material by the rubber cylinder to the glassine paper 14 at a rate of approximately 1.6 grams per square meter to form layer 16. The applied coat is smoothed using a smoothing roller which runs approximately 4% slower than the paper.

Step 34 is carried out to immediately cure the applied silicone layer 16. As hereinafter described this step is preferably carried out using a dichroic filter to apply a balance of ultraviolet and infrared rays to the silicone material on the glassine paper to cure it prior to the carrying out of the adhesive application steps hereinafter described.

Step 36 involves the application of a hot melt adhesive layer 18 over the cured silicone layer 16. This step is preferably carried out using a slot die to apply hot melt adhesive at a rate of approximately 15 grams per square inch.

At this point the stock 12 provided in step 20 as a first element and the three-layer release paper consisting of glassine paper 14, cured silicone layer 16 and hot melt adhesive layer 18 are fed to laminating rollers to carry out step 38 of joining the two elements into the four layer laminated product 10 shown in FIG. 1. Step 40, typical of commercial application of the present invention, involves slitting the four layer, laminated self-adhesive label stock with release paper into two strips or more or webs and re-winding them on suitable carriers for transportation to a printing facility or the end user as desired.

Figure 3:
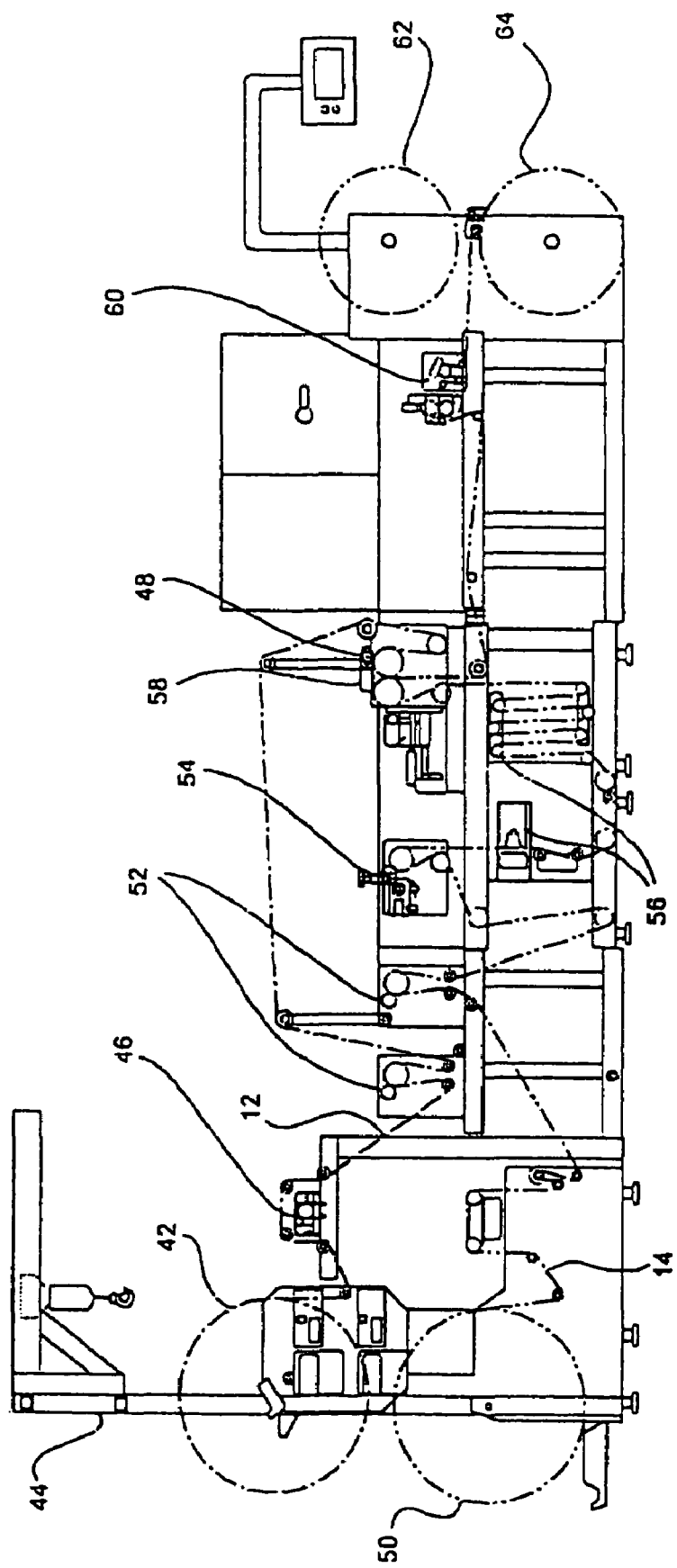
FIG. 3 is a schematic diagram of an apparatus for carrying out the method of FIG. 2.

Referring now to FIG. 3, an apparatus for carrying out the process of FIG. 2 is schematically shown. The apparatus of FIG. 3 comprises a de-reeling or un-winding station 42 for the face stock material 12. The apparatus may include a hoist 44 for raising the roll 42 of label stock/face stock into the desired position. Thereafter the stock 12 is threaded to and through a web guiding system 46 and through a series of in-feed rollers 52 toward the lamination station 48, where the face stock material 12 is joined with the pre-treated backing paper as previously described.

The glassine paper 14 is provided on a double-wide roll 50 mounted on a de-reeling or un-winding apparatus below the face stock roll 42. The glassine paper 14 is threaded through a series of rollers as shown to the in-feed station 52 and thereafter to the silicone coating head 54 where the steps 26, 28, 30 and 32 are carried out. From the silicone coating head 54 the backing paper proceeds to the curing and post curing stations 56 where a combination of ultraviolet and infrared rays are directed to the photocationic silicone layer to cure it as described with reference to step 34 in FIG. 2. Thereafter the silicone coated glassine backing paper 14 moves to and through the adhesive coating station 58 where the hot melt adhesive is applied. The glassine paper 14 with the silicone and adhesive layers 16 and 18 is thereafter moved directly to the lamination rollers 48 where it is joined with the label stock 12 to carry out step 38 of FIG. 2. An out-feed station 60 and dual roll re-winding equipment 62, 64 carry out step 40 as described above.

Figure 4:
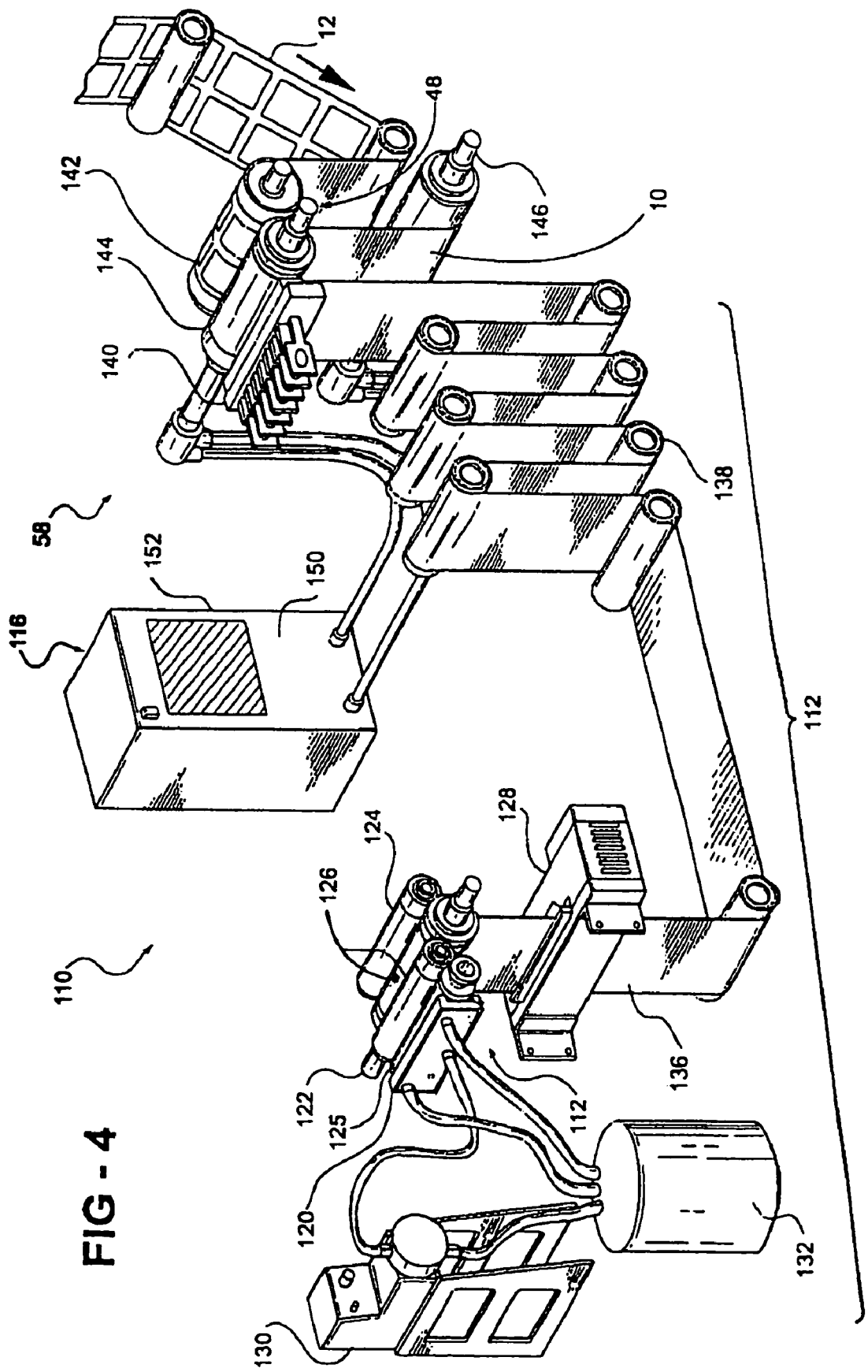
FIG. 4 shows an apparatus for manufacturing articles with pressure sensitive adhesive according to the present invention.

With reference to FIG. 4, there is shown an apparatus 110 to manufacture laminated product 10 by processing glassine backing paper 14 and face stock 12 into the laminated product 10. A layer of silicone 16 is applied at a silicone workstation 112 onto a continuous roll of glassine backing paper 14 prior to curing the applied layer of silicone 16 to define the continuous web of release paper 136. The apparatus 110 manufactures a web release paper 136 in an upstream silicone workstation 112 and then feeds the continuous web of release paper 136 to a lamination workstation 48. The silicone workstation 112 includes a peristaltical pump 130 for pressurizing and pumping the silicone 16 from a receptacle 132 holding the silicone 16 to the glassine backing paper 14. The Silicone workstation 112 then smears the silicone 16 evenly on the backing paper 14 after the silicone 16 has been spread with the close chambered doctor blade 120. A drive roller 126 contacts the backing paper 14 on the outside surface and the smearing rollers 122 and 124 contact the applied layer of silicone 16 on the inside surface while the web of release paper 136 is driven forward by the drive roller 126. The silicone is smeared with a silicone coating roller 122 having a faster surface speed than the surface speed of the drive roller 126 and a smoothing roller 124 having a slower surface speed than the surface speed of the drive roller 126 so that the applied layer of silicone is smeared evenly on the glassine backing paper 14. The silicone coating roller 122 and the smoothing roller 124 run at different speeds than the drive roller 126. Typically, the silicone coating roller 122 rotates between 3% to 5% inclusive faster than the speed of the web 136, and the smoothing roller 124 rotates between 3% to 5% inclusive slower than the speed of the web 136. Both the silicone coating roller 122 and the smoothing roller 124 can rotate in the opposite direction to that of the web 136. While this differential in rotating speeds has been found to provide satisfactory smearing of the applied layer of silicone 16 evenly onto the glassine backing paper 14, it should be recognized that other speeds can be used without departing from the disclosure of the present invention.

Figure 5A:
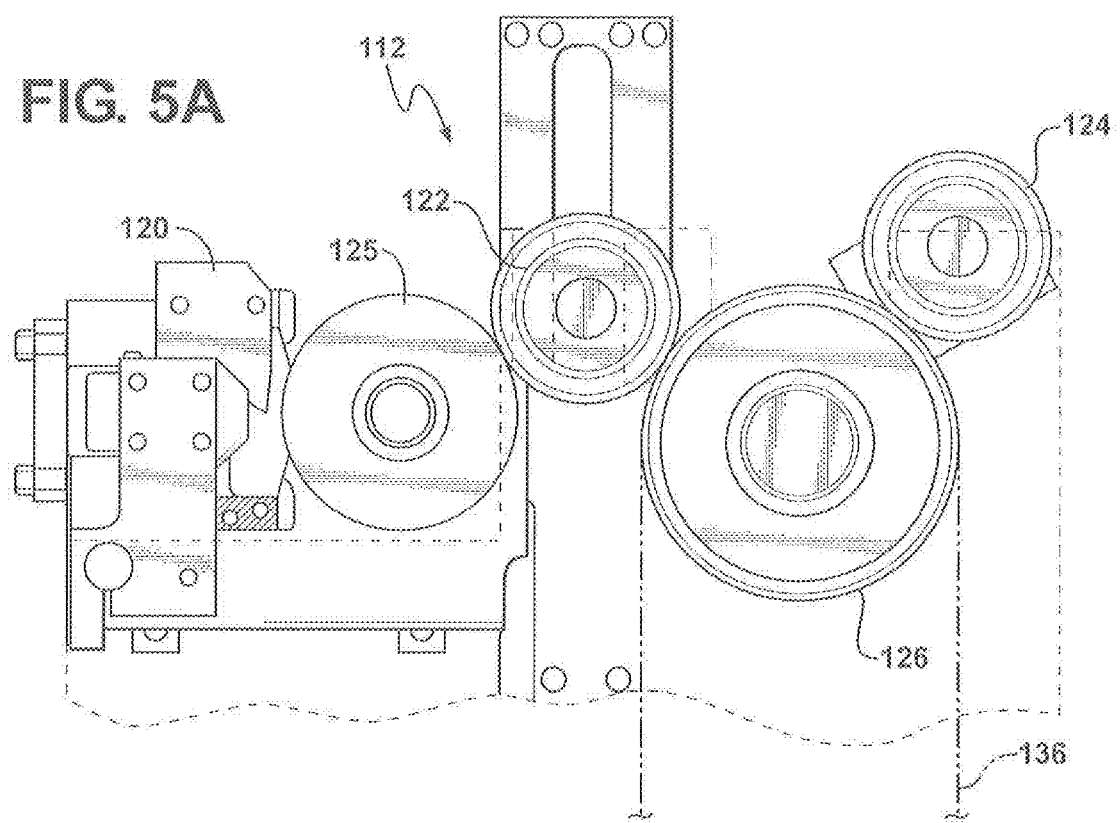
FIG. 5A shows a partial view of the silicone application workstation.
Figure 6:
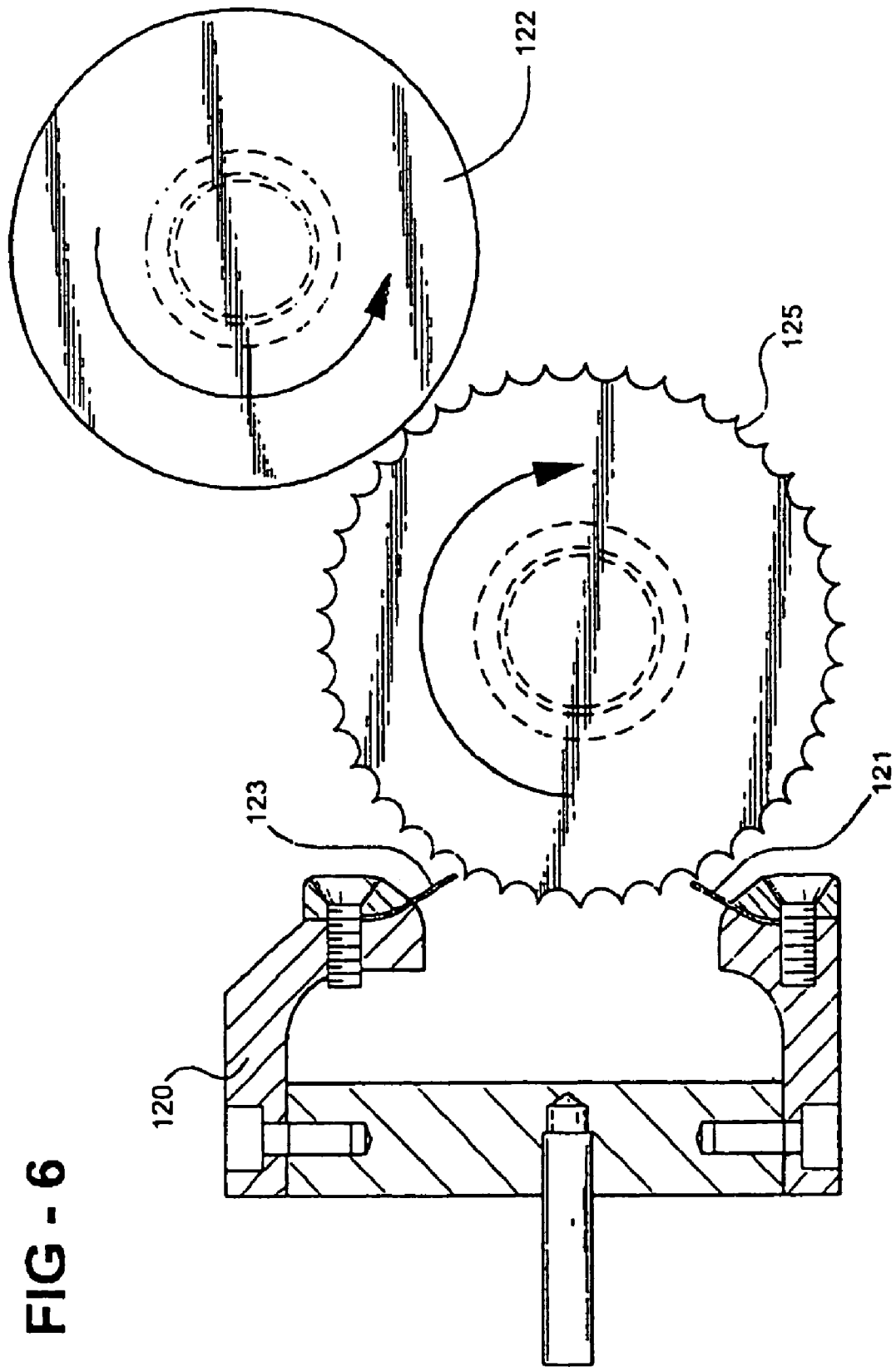
FIG. 6 shows an enlarged view of the doctor blade configuration.

Referring now to FIG. 5A, there is shown a closeup of the silicone application workstation 112. The apparatus 110 uses a close chambered doctor blade 120 positioned at the silicone application workstation 112 for applying a layer of silicone 16 onto an ANILOX® roller 125. The close chambered doctor blade 120, best seen in FIG. 6, forms an enclosed chamber that eliminates the foam effect. The silicone enters through the lower part of the doctor blade and exits with the foam from the upper section of the doctor blade. A first reverse angle blade 121, on the doctor blade, coats the ANILOX® roller 125 with foamless silicone, then a second reverse angle blade 123 smooths the application to ensure that every pore of the ANILOX® roller 125 is properly filled with silicone. The ANILOX® roller 125 in this embodiment is a ceramic 440 line ANILOX® roller. After the ANILOX®0 roller is coated with silicone, the silicone is transferred to the silicone coating roller 122 which in a preferred embodiment is a rubber cylinder with a hardness of between 30 duros to 50 duros inclusive. The silicone coating roller 122 spins in the opposite direction and has a differentiated speed of approximately 3% to 5% inclusive faster than the speed of the web, and preferably a differential speed of 4% faster than the speed of the web 136. The preferred embodiment provides for an application of approximately 1.6 grams of silicone per square meter (1.6 $g/m^2$). While this quantity of silicone has been found to be satisfactory, it should be recognized that other quantities of silicone can be used without departing from the disclosure of the present invention. The silicone is applied to the backing paper while in contact with the silicone coating roller 122. A smoothing roller 124, as shown in FIG. 5A, completes the silicone spreading process. The smoothing roller 124 has a differential speed of approximately 3% to 5% inclusive slower than the speed of the web 136, and preferably a differential speed of 4% slower than the web 136.

Figure 5B:
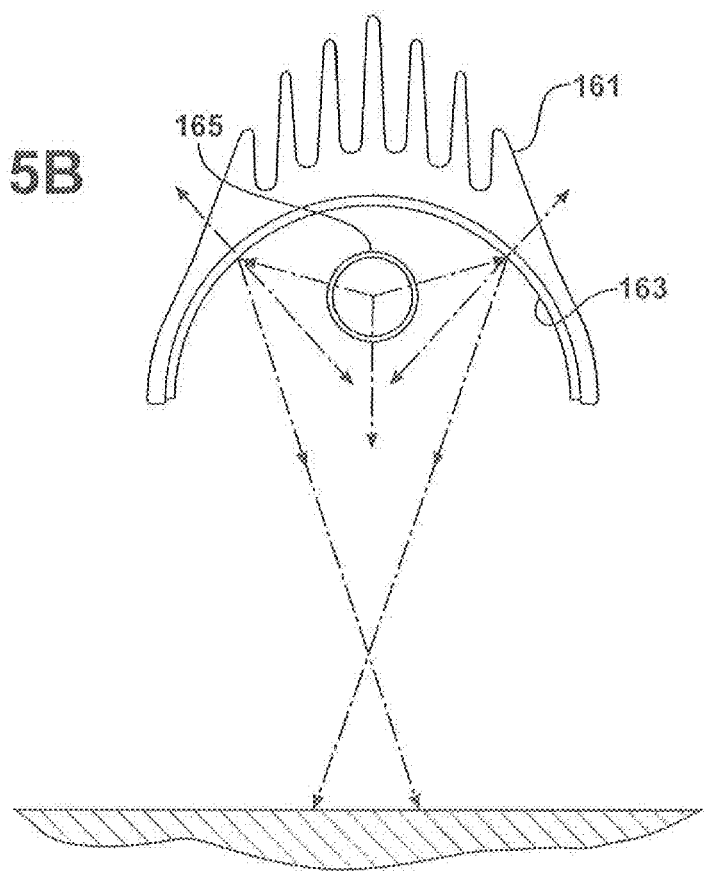
FIG. 5B shows a dichroic cavity reflector.

Referring back to FIG. 4, the silicone workstation 112 includes at least one source 128 of ultraviolet light (UV) spaced at a constant distance from the release paper 136 for curing the applied layer of silicone 16. The UV curing system in the preferred embodiment is based on a commercially available curing management system with a dichroic cavity reflector, identified as model number CMS VTI DCR6, from VTI-Idealquarz Company of Milan, Italy. The commercially available curing management system is modified according to the present invention to provide a UV reflector specifically conceived for curing silicone during continuous processing applications. A dichroic cavity reflector 160, as shown in FIG. 5B, has been modified from the production standard model CMS VTI DCR6 in order to allow the proper quantity of infrared rays to reach the substratum. The reflector comprises an aluminum reflector body 161 the parabolic interior surface of which is covered by a dichroic mirror 163 normally finished to reflect 98% of ultraviolet radiation and absorb 85% of infrared radiation from lamp 165. We have found that conventional dichroic reflectors used to disburse infrared radiant heat are too cold to properly cure the silicone. On the other hand, more commonly used aluminum reflectors provide too much heat, i.e. too many infrared rays reach the layer of silicone for proper curing. In order to obtain a satisfactory combination, the parabola that supports the dichroic mirror 163 in the reflector body 161 is made of non-finished aluminum. The silver color is more reflective than the standard black or dark gray colors normally found in dichroic systems. This dichroic reflector allows infrared rays to pass through while an appropriate amount of UV rays are reflected. Between 5% and 15% of the total wavelengths of infrared radiation, in addition to direct radiation from the lamp, are reflected back toward the photo-cationic silicone. The parabola is, therefore, a break for infrared rays allowing the necessary amount of UV and infrared rays to reach the photo-cationic silicone for curing.

Following the curing step, the layer of silicone 16 is provided with a predetermined amount of dwell time prior to the application of the adhesive 18. The dwell time can provided by using a plurality of idler rollers 138. The idler rollers 138 provide for a serpentine path of travel between the silicone workstation 112 and the adhesive workstation 58 where the adhesive 18 is applied. The dwell time can be modified based on the requirements of the applied layer of silicone 16 to cure sufficiently by modifying the number of idler rollers 138 placed in the path of the web of release paper 136. For this particular application using hot melt adhesive, approximately 2.5 seconds of dwell time is preferred after the applied layer of silicone 16 goes through the curing process.

Figure 7:
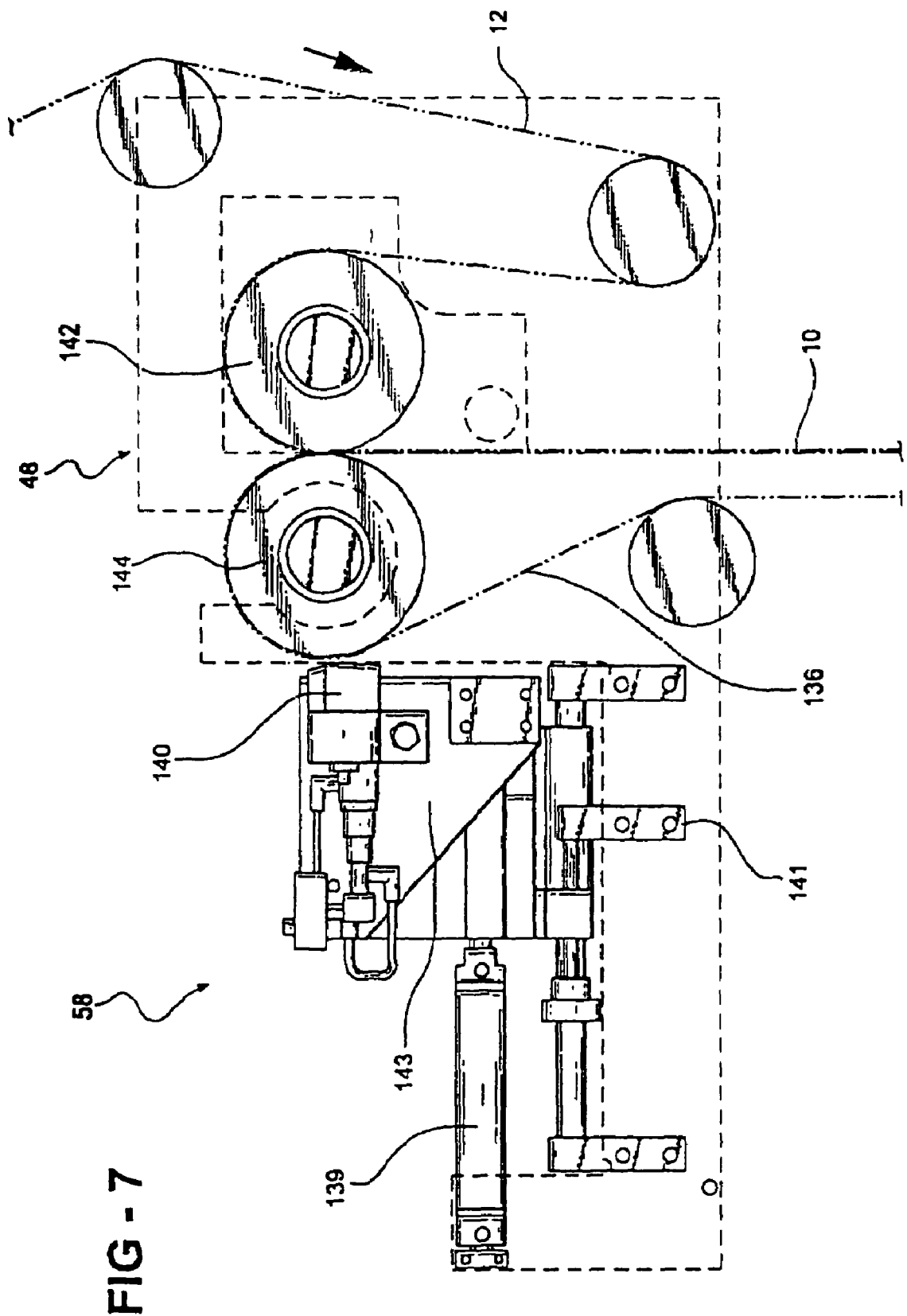
FIG. 7 shows a partial view of the adhesive and lamination workstations.

The lamination 48 and adhesive workstations 58 are shown in context of the entire apparatus in FIG. 4 and shown in a close-up view in FIG. 7. The adhesive workstation includes a slot die 140 adjustably supported from a frame. An adhesive coating head kickoff 139 and a stopper 141 are used to adjust the slot die holder 143 to locate the slot die 140 in the proper angular, radial, and lateral position relative to a longitudinal axis of a cooling roller 144. The release paper 136 and the face stock 12 are laminated together while passing between the cooling rubber roller 144 and the lamination roller 142. The slot die 140 applies adhesive 18 to the release paper 136 at an adhesive workstation 58 prior to entering the lamination workstation 48. A continuous strip of face stock 12 and the web of release paper 136 are laminated together with adhesive 18 at the lamination workstation 48. The hot melt adhesive 18 is conducted to the slot die through a heating hose from the adhesive distribution station where the adhesive is melted. From the slot die 140, approximately fifteen grams of adhesive per square meter (15 g/m$^2$) are applied to the release paper 136. While this quantity of adhesive has been found to be satisfactory, it should be recognized that other quantities of adhesive can be used without departing from the disclosure of the present invention. The adhesive coating head kickoff 139 allows the slot die to be moved forward and backward with respect to the release paper for adjustment of the desired thickness with suitable fasteners such as releasable screws, bolts, and nuts. The slot die holder and the adjustment system 143 allows the angle and the parallelism of the slot die to be adjusted relative to a first cooling roller 144 by releasing the appropriate fastener, repositioning the holder into the desired position, and reattaching the fastener to maintain the holder in the new desired position. Placing the slot die at a one degree (1°) angle has been found to give the smoothest coating result in the preferred embodiment. More precise micro-metric adjustments can be made to the slot die holder 143 with a stopper 141 held in place with suitable fasteners such as releasable screws, bolts, and nuts.

In order to apply hot melt adhesive to transparent film, a different slot die with a rotating cylindrical rod is typically used. The slot die provides a more even application as a result of the rotating rod. The face stock 12 in this embodiment can be preprinted on the inside surface, the outside surface, or both surfaces for application as pressure sensitive labels. Alternatively, or additionally, the face stock can be printed just prior to entering the lamination workstation.

The hot melt adhesive will transmit heat into the release paper 136 and into the laminated product 10. The release paper 136 and subsequently the laminated product 10 can be cooled down at a cooling workstation 116. The cooling workstation 116 cools the release paper 136 after the hot melt adhesive is applied, with the first cooling roller 144 and then cools the laminated product 10 with a second cooling roller 146. The first roller 144 has an internal passage for receiving a continuous stream of coolant. The first roller 144 is located downstream of the adhesive workstation 58 for cooling the release paper 136. The face stock and the release paper are laminated together as the two strips or webs are passed between the first cooling roller 144 and a lamination roller 142. Both rollers have exactly the same diameter and width to avoid a curling effect. Lamination occurs immediately after the application of the hot melt adhesive since the release paper coated with adhesive cannot engage with other idler rollers uncovered and the desired temperature for lamination of the hot melt adhesive is a temperature achieved after being cooled by the rubber roller but while still warm enough for good lamination. Once both layers have been laminated together, the web engages a second cooling roller 146 to complete the lamination of the laminated product 10. The second roller 146 also includes an internal passage for receiving a continuous stream of coolant. The second roller 146 is located downstream of the lamination workstation 48 for cooling the final laminated product 10. The product can then be slit or cut into multiple separate webs to obtain material with a narrower width. After cutting into the desired widths, the final product is rewound into a roll.

The cooling workstation 116 includes a pump 150 for pumping the continuous stream of coolant through the first cooling roller 144 and the second cooling roller 146. A heat exchanger 152 removes heat from the coolant after passing through the cooling rollers. Following the cooling process, the laminated product 10 is wound on a final roll and is ready for processing or storage. The laminated product roll can be removed and cut to proper size so that the face stock 12 can be peeled from the release paper and will retain the adhesive on the inside surface for attaching to an end product. The apparatus can be equipped with an in-line rotary die-cutter to obtain final labels in one simple operation.

Using the present invention, the label manufacturers print the face stock and produce the laminated product with the apparatus described in the preferred embodiment instead of buying the prefabricated laminated product and subsequently printing on the face stock. An additional benefit is achieved with the present invention when the clear face stock is printed on the reverse surface prior to lamination because the print is then protected by the clear face stock. When the face stock is delaminated and applied to a container, the print is protected with the clear film, eliminating the requirement of protection with an additional pressure sensitive film, UV varnish, or UV glued film.

Savings on the raw material start at thirty percent and can go up to 90%. Furthermore, savings are generated by a reduction of waste due to the fact that only face stock is being processed through the printing press. There are no limitations on printing methods. The choice of printing methods can be digital, flexo-graphic, offset, letterpress, silk screen, etc. and can convert custom materials into a final label. Furthermore, speed limitations on presses are eliminated since the die cutting operation is transferred to the apparatus rather than on the presses as found in the prior art.

The present invention using the above-mentioned apparatus allows an operator to create standard applications, multiple layer applications, or complex applications. Standard applications include any kind of face stock: semigloss, thermal direct, Kromecote, PP, PE, PET, carton, metallized papers, etc. The standard application includes backing materials which can include glassine paper or film. The multiple layer applications include piggyback, back-to-back, dry peel piggyback and dry peel cards, coupon labels, and booklets and leaflets. The complex applications include film labels with reverse printing, no label look, no label touch, pressure sensitive shrink sleeves, electronic chips and spiral antennas insertion for RF/ID, labels with detachable parts, scratch off and reveal, embossed, Braille and tactile labels, and fragrance or scratch'n'sniff labels.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of making a continuous strip of laminated printed adhesive labels comprising the steps of:
    dereeling a strip of release stock into a first in-feed location in a stock-processing machine having a plurality of spaced-apart workstations to receive and process moving strip stock;
    at a first workstation, applying a layer of curable silicone to one surface of the dereeled and in-fed release stock;
    at a second workstation, fast-curing the layer of curable silicone;
    at a third workstation, applying a hot melt adhesive to the cured silicone layer on the dereeled strip of release stock;
    at least partially solidifying the adhesive by cooling over a first cooled roller;
    feeding into a second in-feed location separate from the first in-feed location a strip of size-matched, preprinted label stock; and
    at a fourth workstation, laminating the label stock strip to the release stock with the printed side of the label stock against and in direct contact with the adhesive;
    wherein the step of applying the silicone is carried out with the use of a rubber coating roller that runs with a surface speed faster than the surface speed of the release stock at the point of application and a smoothing roller which runs at a surface speed slower than the surface speed of the release stock at the point of application.

2. The method of claim 1 including the further step of cooling the laminated label stocks using a second cooled roller located downstream of the first cooled roller in the direction of stock movement.

3. The method of claim 1 wherein the step of applying the silicone includes the substeps of transferring silicone onto an Anilox roller, thereafter transferring the silicone onto said rubber coating roller and thereafter applying the silicone to the release stock.

4. The method of claim 1 wherein the step of curing the silicone is carried out photometrically using UV radiation.

5. The method of claim 4 wherein the step of curing is carried out with the use of a dichroic reflector.

6. The method of claim 1 wherein the printing on the label stock is on the side which contacts the adhesive layer in the fourth station lamination step.

\* \* \* \* \*